(12) United States Patent
Kim

(10) Patent No.: US 10,005,436 B2
(45) Date of Patent: Jun. 26, 2018

(54) BRAKE PEDAL APPARATUS FOR A VEHICLE

(71) Applicant: HYUNDAI MOTOR COMPANY, Seoul (KR)

(72) Inventor: Eun Sik Kim, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/367,801

(22) Filed: Dec. 2, 2016

(65) Prior Publication Data

US 2018/0111590 A1 Apr. 26, 2018

(30) Foreign Application Priority Data

Oct. 21, 2016 (KR) .................. 10-2016-0137353

(51) Int. Cl.
*B60T 7/06* (2006.01)
*G05G 1/30* (2008.04)

(52) U.S. Cl.
CPC .............. *B60T 7/065* (2013.01); *G05G 1/30* (2013.01)

(58) Field of Classification Search
CPC ... B60T 7/04; B60T 7/06; B60T 7/065; G05G 1/30; G05G 1/32; G05G 1/445; G05G 1/50
See application file for complete search history.

(56) References Cited

U.S. PATENT DOCUMENTS

| | | | | |
|---|---|---|---|---|
| 6,478,365 | B1 * | 11/2002 | Shindo | B60R 21/00 280/752 |
| 6,564,672 | B2 | 5/2003 | Brock et al. | |
| 6,810,766 | B2 * | 11/2004 | Mizuma | B60R 21/09 74/512 |
| 7,011,339 | B2 * | 3/2006 | Oono | B60T 7/065 280/748 |
| 7,111,703 | B2 * | 9/2006 | Endo | B60R 21/09 180/274 |
| 7,503,235 | B2 * | 3/2009 | Podkopayev | G05G 1/30 74/512 |
| 7,665,565 | B2 * | 2/2010 | Tokumo | B60R 21/09 180/271 |
| 7,849,950 | B2 * | 12/2010 | Hatakenaka | B60R 21/09 180/274 |
| 8,276,478 | B2 * | 10/2012 | Tokumo | B60R 21/09 74/512 |
| 8,590,660 | B2 * | 11/2013 | Blais | B60R 21/09 180/274 |

(Continued)

FOREIGN PATENT DOCUMENTS

| | | |
|---|---|---|
| JP | 2001114135 | 4/2001 |
| JP | 2002053016 A * | 2/2002 |

(Continued)

OTHER PUBLICATIONS

KR Office Action dated Jan. 22, 2018, Office Action in corresponding Korean Patent Application 10-2016-0137353; dated Jan. 22, 2018; 6 pages.

*Primary Examiner* — Adam D Rogers
(74) *Attorney, Agent, or Firm* — Lempia Summerfield Katz LLC

(57) ABSTRACT

A brake pedal apparatus for a vehicle has a pedal member manufactured by bending one steel plate. A pedal arm is forcibly rotated forwards by the pedal member being deformed in the event of crash or rear-end collision.

9 Claims, 8 Drawing Sheets

(56) References Cited

U.S. PATENT DOCUMENTS

| | | | |
|---|---|---|---|
| 9,032,836 B2* | 5/2015 | Min | G05G 1/327 |
| | | | 74/512 |
| 9,298,209 B2* | 3/2016 | Kim | G05G 1/44 |
| 9,523,998 B2* | 12/2016 | Sukonthapanich | G05G 1/327 |
| 2012/0031220 A1* | 2/2012 | Seki | B60R 21/09 |
| | | | 74/512 |
| 2014/0182411 A1* | 7/2014 | Sato | B60T 7/065 |
| | | | 74/512 |

FOREIGN PATENT DOCUMENTS

| | | |
|---|---|---|
| JP | 5625601 B2 | 11/2014 |
| KR | 1020050024717 A | 3/2005 |
| KR | 1020050049091 | 5/2005 |
| KR | 100820240 B1 | 4/2008 |
| KR | 1020130116563 | 10/2013 |

* cited by examiner

BRAKE PEDAL APPARATUS FOR A VEHICLE

CROSS-REFERENCE TO RELATED APPLICATION

This application claims the priority benefit of Korean Patent Application No. 10-2016-0137353, filed on Oct. 21, 2016, in the Korean Intellectual Property Office, the disclosure of which is incorporated herein by reference.

BACKGROUND

1. Field of the Disclosure

The present disclosure relates to a brake pedal apparatus for a vehicle.

2. Description of the Related Art

Generally, a brake pedal apparatus is provided in a vehicle and operable by a driver for deceleration or braking.

The brake pedal apparatus mainly includes a pedal member, i.e., a pedal bracket or mounting bracket, coupled to a car body and a pedal arm rotatably connected to the pedal member, which is operated by a foot of the driver.

A conventional pedal member is a structure assembled with separated steel plates using welding or nuts and bolts. Since significant time is spent on assembly and manufacture, productivity is low. Particularly, since a separate jig is necessary for assembly, investment costs are increased.

Furthermore, a steel plate coupled to a cowl of a plurality of steel plates that constitute the pedal member requires higher strength than the other steel plates. To satisfy high strength, a thick steel plate is used. Since steel plates having different thicknesses are provided to manufacture the pedal member, it is inconvenient to manufacture the pedal member, manufacturing costs are increased, and a disadvantage arises on forming the pedal member due to a high thickness.

Namely, in the event of a crash or a rear-end collision, the amount of force or movement of the pedal arm in a direction toward the driver (i.e., in a rear direction) should be minimized so as to maximally prevent leg injury of the driver caused by the brake pedal apparatus. To this end, when an accident occurs, the pedal member should separate from the cowl corresponding to a car body. For easy separation, generally, the pedal member is coupled to the cowl using a welded bolt and a fixed nut.

Furthermore, when the appearance or form of the steel plate coupled to the cowl, among a plurality of steel plates constituting the pedal member, is not changed in the event of an accident, the pedal member may be easily separated from the cowl. To this end, the steel plate coupled to the cowl has a higher thickness than the other steel plates.

SUMMARY

Therefore, the present disclosure has been derived in view of the above problems. One object of the present disclosure is to provide a brake pedal apparatus for a vehicle that includes a pedal member using one panel or plate to improve workability and productivity and to decrease manufacturing costs. Another object of the present disclosure is to provide a brake pedal apparatus for a vehicle in which a pedal arm coupled to a pedal member is forcibly rotated in a forward direction (i.e., away from the driver) in a crash or a rear-end collision to help prevent a leg injury of a driver due to the pedal apparatus.

In accordance with an aspect of the present disclosure, the above and other objects can be accomplished by the provision of a brake pedal apparatus for a vehicle that includes a pedal member coupled to a car body or that is configured to be coupled to a car body. The pedal member is formed of one steel plate. A pedal arm is rotatably coupled to the pedal member.

The pedal member may be formed by multiple bending of an expanded pedal member of one steel plate, which is cut or otherwise configured to define a shape of the expended pedal member.

The steel plate may have a uniform thickness before forming the pedal member by bending.

The pedal member formed of one steel plate may include a dash panel coupling part formed at a center of the pedal member, a pair of side parts formed at left and right sides of the dash panel coupling part, and an extended part having a linear shape. The extended part may be formed between the pair of side parts. The extended part may include a cowl coupling part, a switch coupling part, and a pedal arm contact part that is configured to contact the pedal arm in the event of an accident.

The pair of side parts may have bolt holes, through which a hinge bolt passes. The hinge bolt may function as a center of rotation of the pedal arm.

The pair of side parts may be bent to face toward each other while being perpendicular to the dash panel coupling part. Bending lines may be formed at boundaries between the pair of side parts and the dash panel coupling part. The bolt holes may be collinear after bending the pedal member.

The extended part may have a plurality of bending lines and the extended part may have a first surface to a seventh surface defined at least some of the plurality of bending lines in a longitudinal direction of the extended part.

The pedal arm contact part may be a boundary defining the first surface and the second surface of the extended part and the pedal arm part may be a part protruding rearward to face an upper part of the pedal arm. The cowl coupling part may be disposed above the pedal contact part. The cowl coupling part may include or be defined by the third surface and the fourth surface of the extended part and may protrude outside or outward from the pair of side parts. The third and fourth surfaces may be bent to form surface contact. The switch coupling part may include or be defined by the seventh surface disposed at an end of the extended part.

A part of the second surface, a part of the fifth surface, and a seventh bending line defining the sixth surface and the seventh surface may be disposed at a space between the pair of side parts, respectively. Portions of both sides of the second surface, portions of both sides of the fifth surface, and both sides of the seventh bending line may be coupled to the pair of side parts using welding, respectively.

The pedal arm may include a pedal arm protrusion, which may be formed at an upper part of the pedal arm. The pedal arm protrusion may be formed as an integral or integrated part of the pedal arm. The pedal arm protrusion may be configured to contact the pedal arm contact part when the pedal member is deformed to decrease a distance between a dash panel coupling part and the bolt holes in the pair of side parts in the event of an accident.

The pedal arm may be coupled to the pedal member and the pedal member may be coupled to a dash panel and a cowl of a vehicle. The dash panel and the dash panel coupling part may be configured to push in a rearward direction toward where a driver would be seated in the vehicle and the pair of side parts may be configured to deform to be broadened to the outside of the pedal member in the event of a crash. The pedal arm contact part may be configured to contact the pedal arm protrusion at a distance between the dash panel coupling part and the bolt holes in the pair of side parts due to deformation of the side parts. The pedal arm may be forcibly rotated forward by force or pressure of the pedal arm contact part.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Hereinafter, a brake pedal apparatus for a vehicle of the present disclosure is described with reference to the accompanying drawings.

Figure 1:
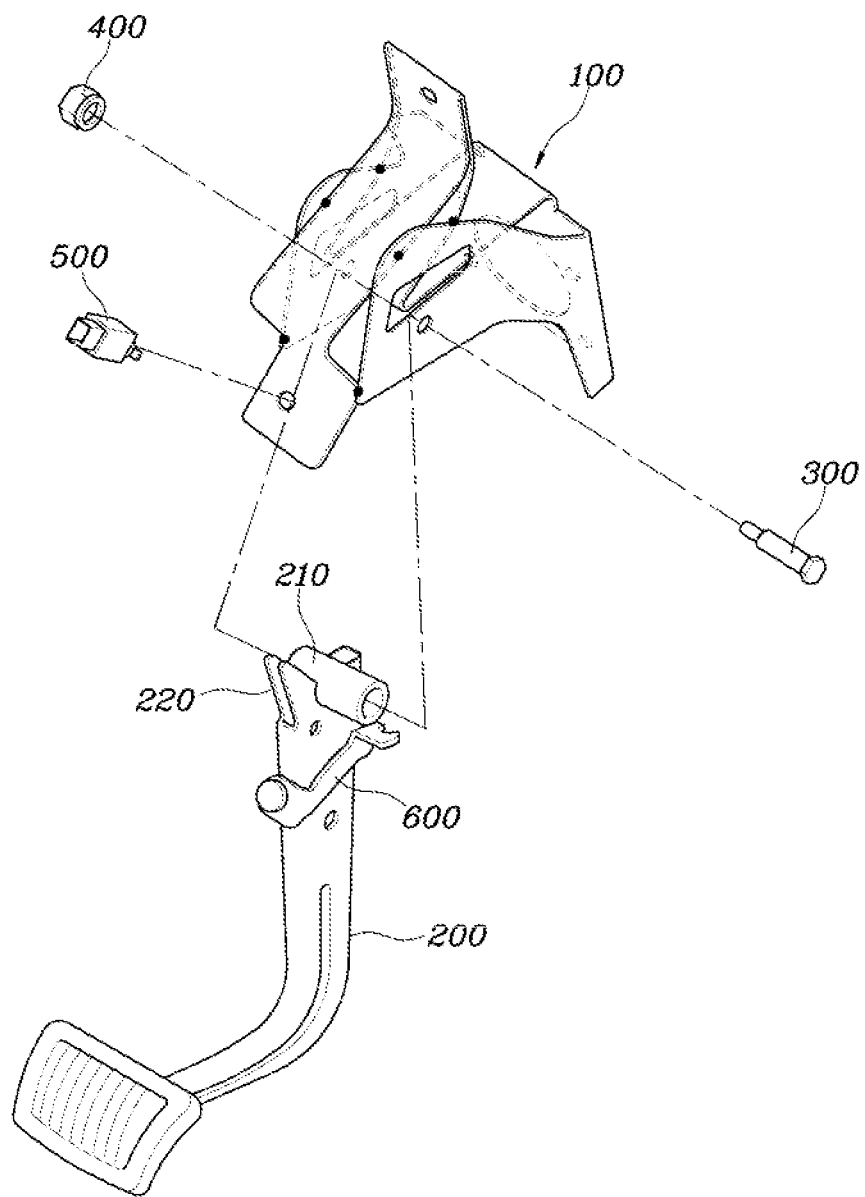
FIG. 1 is an exploded perspective view of a brake pedal apparatus for a vehicle according to the present disclosure.
Figure 2:
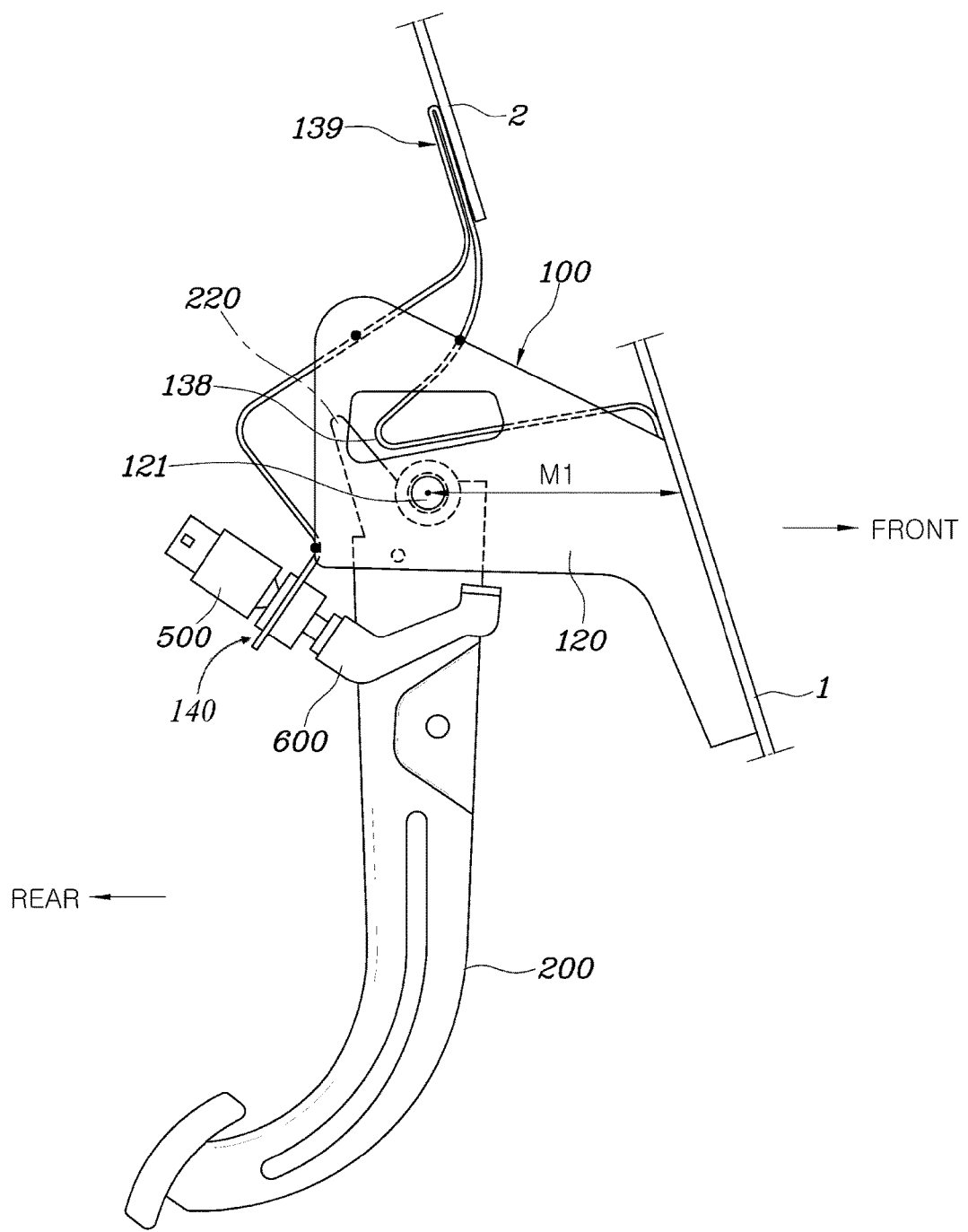
FIG. 2 is a side view of the brake pedal apparatus of FIG. 1 in an assembled state.

As illustrated in FIGS. 1-8, a brake pedal apparatus for a vehicle according to the present disclosure includes a pedal mounting bracket or pedal member 100 mounted or coupled to a car body, as depicted in FIG. 2. The pedal member 100 is formed using one steel plate, as described below. The brake pedal apparatus also includes a pedal arm 200 rotatably coupled to the pedal member 100.

The car body includes a dash panel 1 and a cowl 2 (which is defined as a cowl panel or a cowl bracket).

Figure 3:
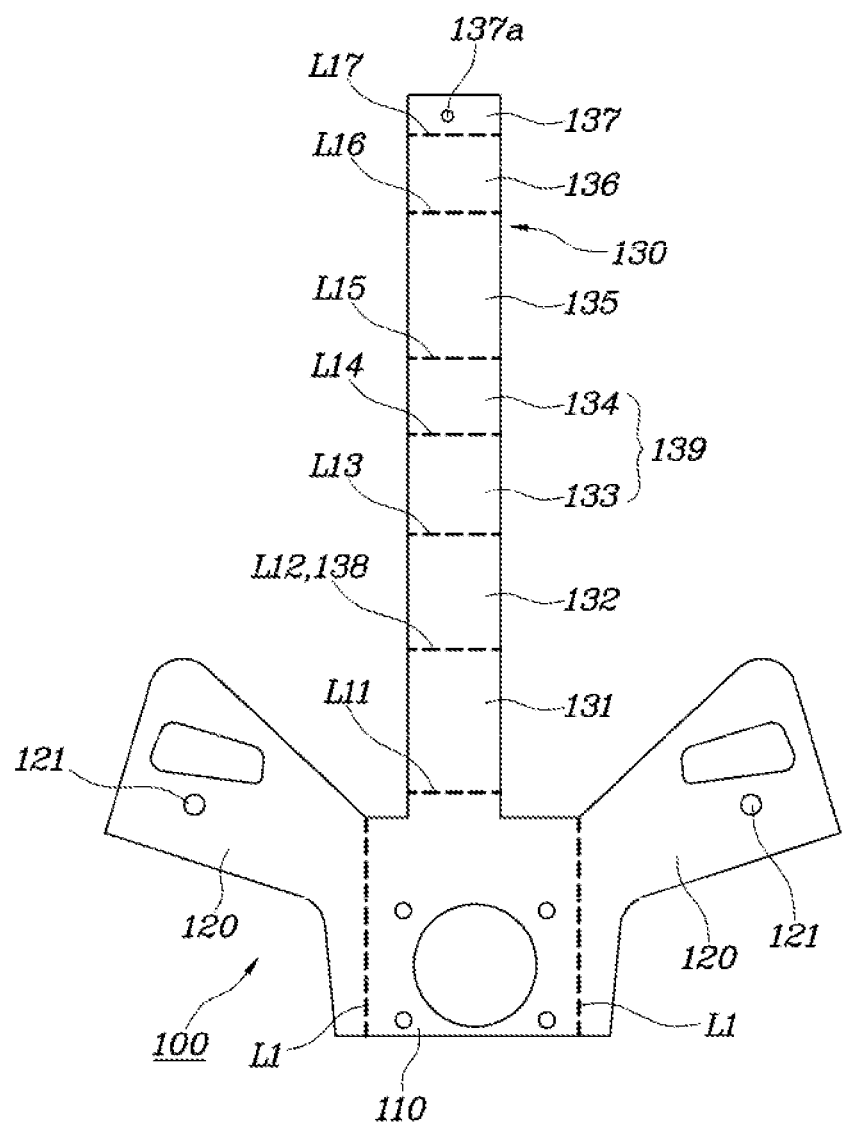
FIG. 3 is a plan view of one steel plate shaped as an expanded pedal member according to the present disclosure.
Figure 4:
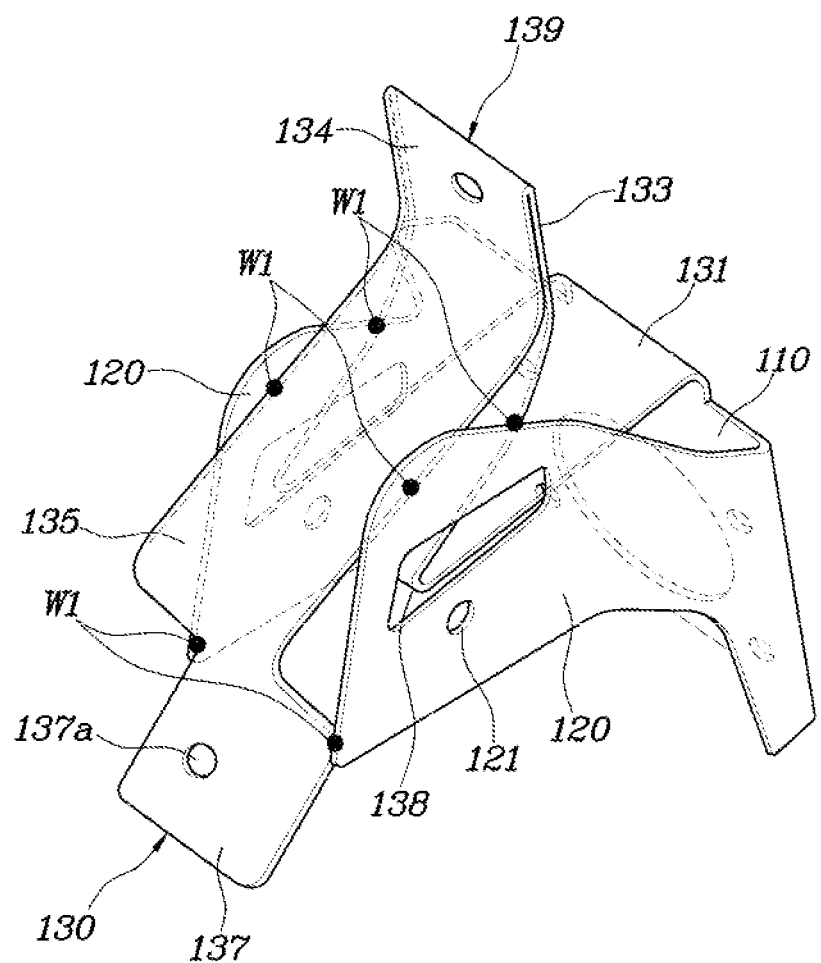
FIGS. 4 and 5 are a perspective view and a side view, respectively, of the pedal member after the expanded pedal member of FIG. 3 is manufactured by bending the one steel plate according to the present disclosure.
Figure 5:
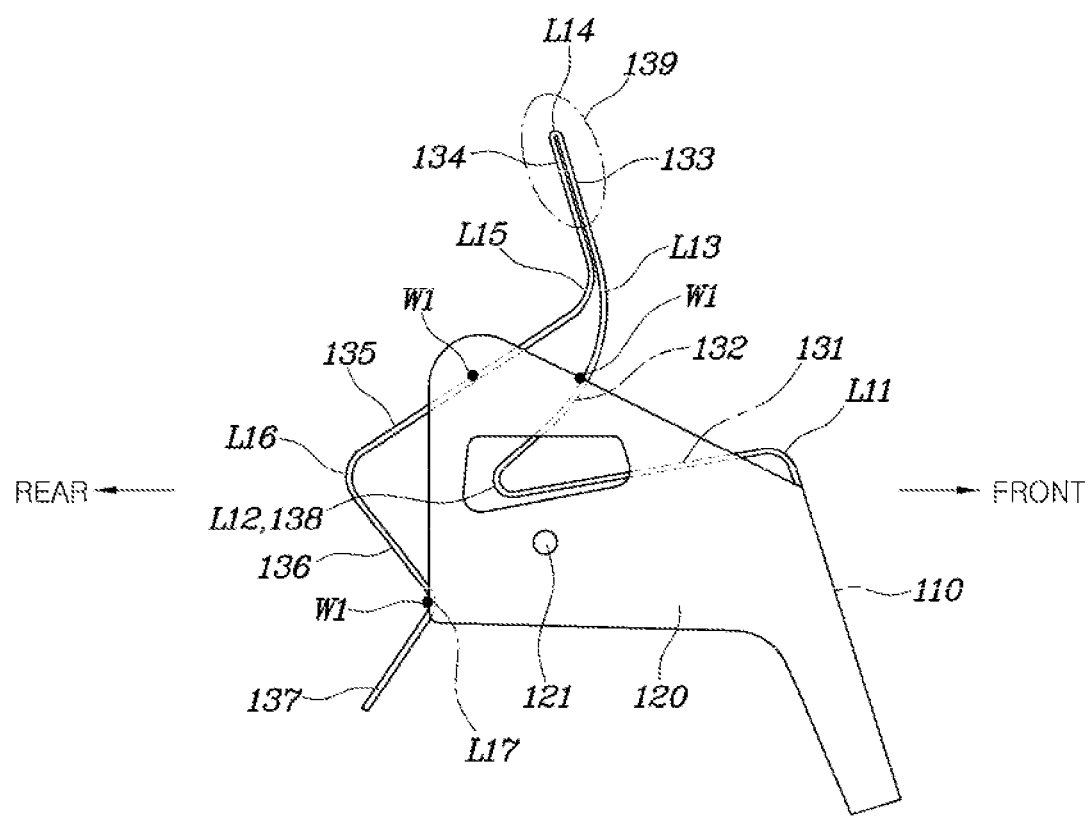
Figure 6:
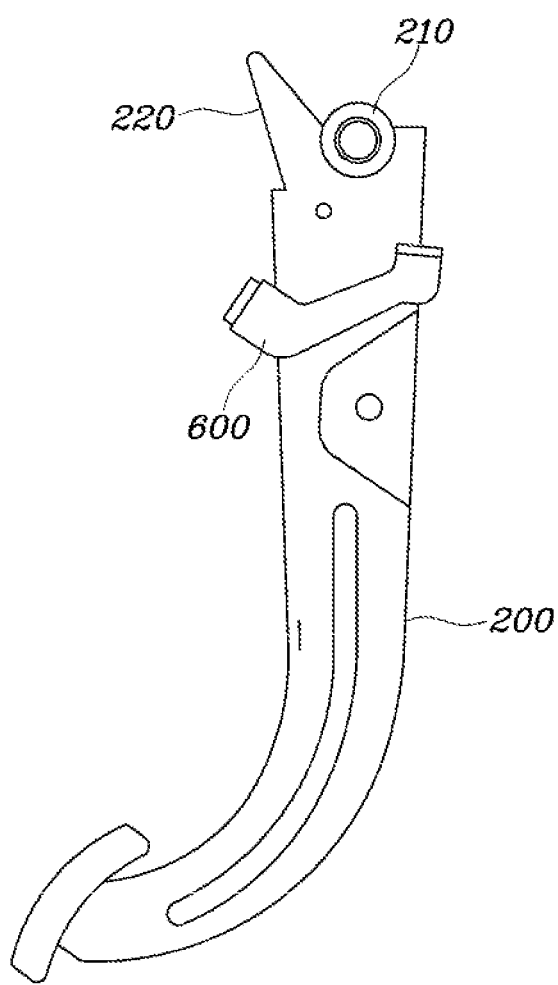
FIG. 6 is a side view of the pedal arm of FIG. 2 and with a pedal arm protrusion formed according to the present disclosure.

The pedal member 100 is formed by first cutting or forming a blank or one steel plate to define a shape of an expended pedal member 100, as depicted in FIG. 3. The pedal member 100 is then manufactured by forming multiple bends in the one steel plate, i.e., the expanded pedal member, to reconfigure the expanded pedal member into the shape of the pedal member.

The entire one steel plate has the same thickness before bending. Thereby, costs may be decreased and it may be easy to manufacture the pedal member 100.

A dash panel coupling part 110 is formed at a center of the pedal member 100 formed using the one steel plate. A pair of side parts 120 is formed at left and right sides of the dash panel coupling part 110. An extended part 130 having a linear shape is formed between the pair of side parts 120. The extended part 130 includes a cowl coupling part 139, a switch coupling part 140, and a pedal arm contact part 138.

The pedal arm contact part is configured to contact the pedal arm 200 in the event of an accident.

The pair of side parts 120 is bent to face to each other across the pedal member 100. The pair of side parts 120 is perpendicular to the dash panel coupling part 110. The pair of side parts are defined with respect to bending lines L1 formed at boundaries between the pair of side parts 120 and the dash panel coupling part 110.

In other words, the pair of side parts 120 is bent to protrude in a rearward direction with respect to the dash panel coupling part 110.

Bolt holes 121, through which a hinge bolt 300 passes, are formed in the a pair of side parts 120, respectively. The hinge bolt 300 functions as a center of rotation of the pedal arm 200. After the pair of side parts 120 are bent, the bolt holes 121 are collinear to guide easy assembly of the hinge bolt 300.

The pedal arm 200 is assembled to the pedal member 100 by first inserting the hinge bolt 300 through the bolt holes 121 of the pair of side parts 120. A pedal arm pipe 210 is coupled to an upper part of the pedal arm 200, and the hinge bolt 300 is also passed through the pedal arm pipe. A nut 400 is then coupled to an end of the hinge bolt, thereby assembling the pedal arm 200 to the pedal member 100. After assembly, the pedal arm 200 is rotated about the hinge bolt 300 about a horizontal axis.

A plurality of bending lines L11 to L17 is separately formed in the extended part 130. The extended part 130 is divided by the bending lines L11 to L17 to define a series of sections or segments, hereinafter called surfaces, of the extended part 130. These sections or segments, i.e., surfaces include a first surface 131, a second surface 132, a third surface 133, a fourth surface 134, a fifth surface 135, a sixth surface 136, and a seventh surface 137 in a longitudinal direction of the extended part 130.

The first surface 131 of the extended part 130 is a surface connected to the dash panel coupling part 110 and is bent to protrude in a rear direction with respect to a first bending line L11. The second surface 132 is connected to the first surface 131 and is bent to protrude upwards with respect to a second bending line L12 while having a circular arc. The third surface 133 is connected to the second surface 132 and is bent to protrude upwards with respect to a third bending line L13. The fourth surface 134 is connected to the third surface 133 and is bent rearward and downward with respect to a fourth bending line L14 while overlapping the third surface to form surface contact therebetween.

The fifth surface 135 is connected to the fourth surface 134 and is bent to protrude in a rearward direction with respect to a fifth line L15. The sixth surface 136 is connected to the fifth surface 135 and is bent downwards with respect to a sixth bending line L16. The seventh surface 137 is connected to the sixth surface 136 and is bent to protrude in a rearward-downward direction with respect to a seventh line L17.

Herein, the first bending line L11 defines a boundary separating the first surface 131 from the second surface 132 and is formed to face the upper part of the pedal arm 200 while protruding in a rear direction. The first bending line L11 corresponds to the pedal arm contact part 138.

In addition, in the extended part 130, the third surface 133 and the fourth surface 134, which are disposed above the pedal arm contact part 138 and protrude outside of the extended part 130, overlap each other with respect to the fourth bending line L14 to form surface contact. The overlapping part of the third surface 133 and the fourth surface 134 corresponds to the cowl coupling part 139.

Since an appearance or configuration of the cowl coupling part 139 should not change in the event of an accident, the cowl coupling part 139 has higher strength than the other parts. To this end, the third surface 133 and the fourth surface 134 overlap each other to form surface contact and, as such, the cowl coupling part 139 may have higher strength.

The cowl coupling part 139 and the cowl 2 are coupled using a bolt, but the present disclosure is not limited thereto.

Furthermore, the seventh surface 137 is disposed at an end of the extended part 130 and is or defines the switch coupling part. A coupling hole 137a is formed at the seventh surface 137 for coupling or mounting a brake switch 500.

The brake switch 500 operates by contact of a switch bracket 600 that is coupled to and moves with the pedal arm 200.

The pedal arm 200 is maintained in a maximally or fully rotated state in a rear direction when the driver does not operate the pedal arm 200. Herein, the switch bracket 600 is in contact with the brake switch 500 whereby a brake lamp of the vehicle is maintained in a lights-out or turned off state.

On the contrary, when the driver presses the pedal arm 200, the pedal arm 200 is rotated in a forward direction. Herein, the switch bracket 600 is separated from the brake switch 500 whereby the brake lamp of the vehicle is turned on.

In the extended part 130, a part of the second surface 132, a part of the fifth surface 135 and the seventh bending line L17, which divides the sixth surface 136 from the seventh surface 137, are disposed within a space between the pair of side parts 120, respectively. Certain parts or portions of both sides of the second surface 132, certain parts or portions of both sides of the fifth surface, and both sides of the seventh line L17 are coupled or joined to the pair of side parts 120 using welding W1, respectively.

According to the illustrated embodiment of the present disclosure, the extended part 130 is coupled, i.e., welded to the pair of side parts 120 at six points using welding W1. Thereby, high strength and stiffness may be imparted to the pedal member 100 to improve durability.

The pedal arm protrusion 220 is formed at the upper part of the pedal arm 200. In this embodiment, the pedal arm protrusion 220 is formed as an integral or integrated part of the pedal arm 200. The pedal arm protrusion 220 is configured to contact the pedal arm contact part 138 when the pedal member 100 is deformed in the event of a crash. Such contact is to decrease a distance (M1→M2) between the dash panel coupling part 100 and the bolt holes 121 in the pair of side parts 120 in the event of an accident. Thus, the pedal arm 200 is forcibly rotated forwards by pressure or force against the pedal arm contact part 138. Thereby, in the event of a crash or a rear-end collision, a leg injury to a driver caused by the pedal apparatus may be prevented.

In an ordinary case without an accident, the pedal arm 200 normally operates to rotate about the hinge bolt 300 in a horizontal axis by operation of a driver. Herein, a distance M1 between the dash panel coupling part 110 and the bolt holes 121 formed in the pair of side parts 120 is maintained at a certain distance as illustrated in FIG. 2. In addition, the pedal arm contact part 138 and the pedal arm protrusion 220 are separated from each other, regardless of rotation of the pedal arm 200, and are thus maintained in a non-contact state during normal operation.

Figure 7:
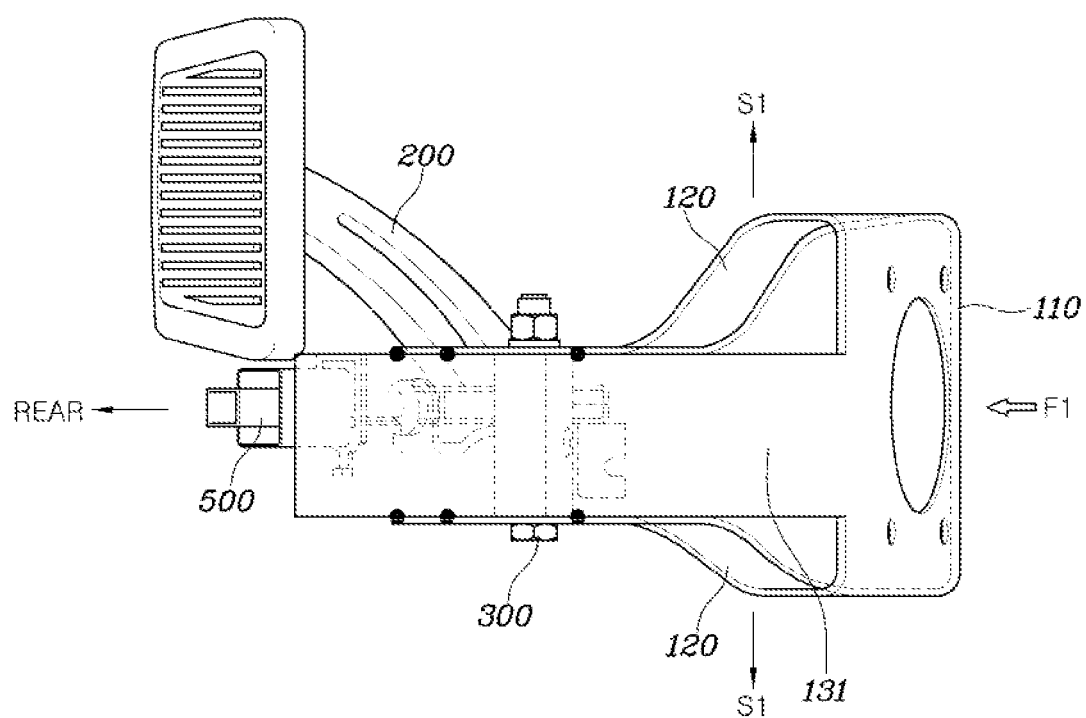
FIGS. 7 and 8 are a plan view and a side view, respectively, of the brake pedal apparatus of FIG. 2 and illustrating forward rotation of the pedal arm upon a crash or a rear-end collision.
Figure 8:
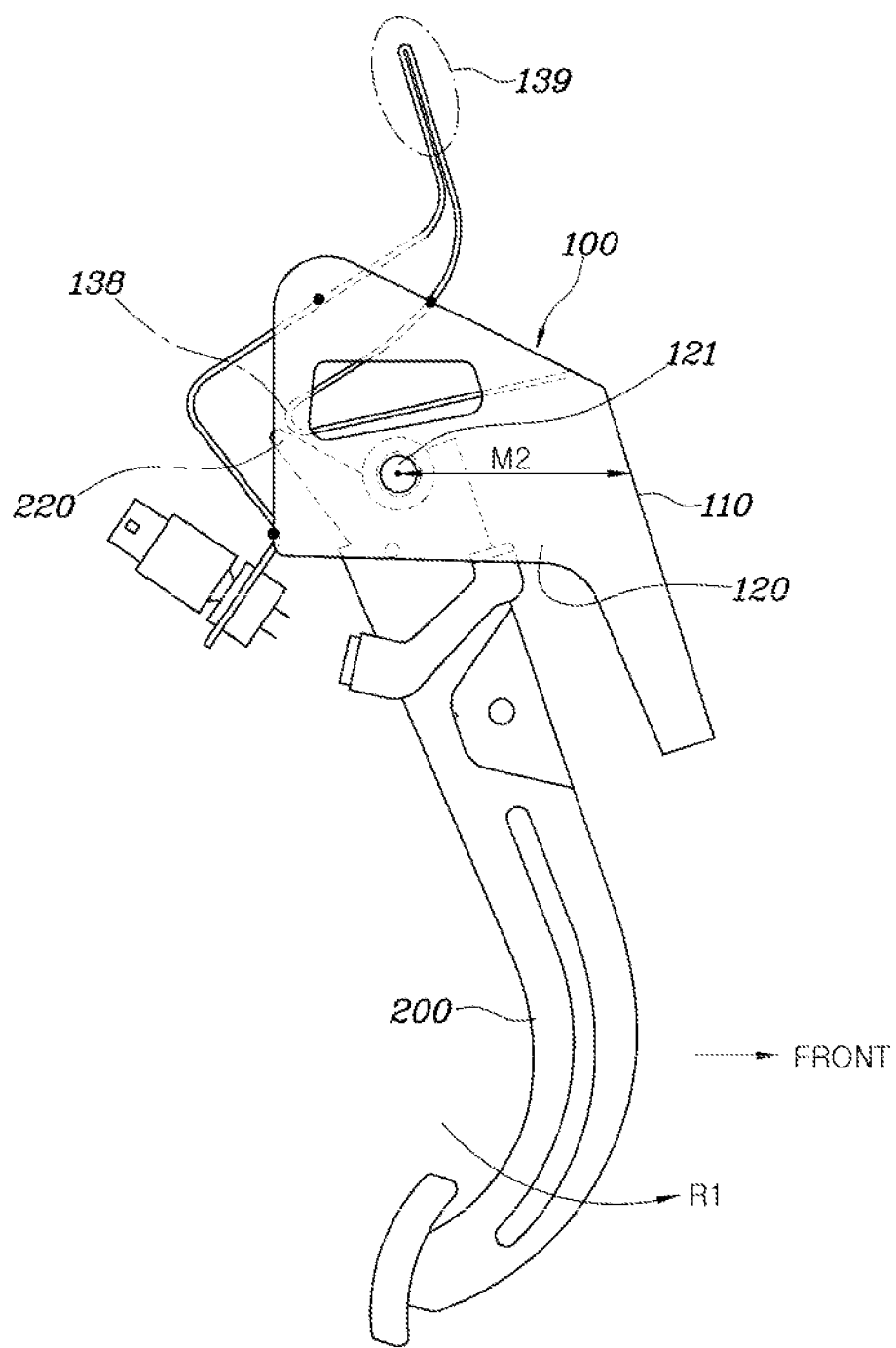

However, the dash panel coupling part 110 and the dash panel 1 push or move in a rearward direction toward where the driver is seated by impact force F1, which is generated in the event of a crash or a rear-end collision, as illustrated in FIG. 7. The pair of side parts 120 have a lower strength than the cowl coupling part 139 and are thus deformed outward, i.e., the space between the pair of side parts is broadened to the outside of pedal member 110 (see arrow S1). As illustrated in FIG. 8, a distance M2 between the dash panel coupling part 110 and the bolt holes 121 in the pair of side parts 120, after deformation of the pair of side parts 120, is decreased (M1→M2). As the distance M2 is decreased, the pedal arm contact part 138 is in contact with the pedal arm protrusion 220. As thus occurs, the pedal arm 200 moves further apart from the driver, which is caused by the pedal arm 200 being forcibly rotated forward due to pressure or force applied by the pedal arm contact part 138 against the pedal arm contact pat 138 (see arrow R1).

According to the illustrated embodiment of the present disclosure, in the event of a crash or a rear-end collision, the pedal arm 200 is forcibly rotated forward to be spaced further apart from the driver, i.e., to move away from the driver. As a result, a leg injury to the driver caused by the pedal apparatus may be prevented or inhibited.

The disclosed brake pedal apparatus, in which the pedal arm 200 is forcibly rotated forward in the event of a crash or a rear-end collision to protect the leg of the driver, has a simple structure, which decreases the number of components, weight, and costs of the apparatus.

According to the illustrated embodiment of the present disclosure described-above, the pedal member 100 is manufactured by bending one steel plate instead of having to bend and join a plurality of steel plates, such that productivity is increased and costs are decreased.

Further, the cowl coupling part 139, which requires higher strength, is provided having, and is easy to be formed as, two overlapping parts of the one steel plate. As a result, costs are considerably decreased since a separate thick steel plate is not used.

In addition, according to the illustrated embodiment of the present disclosure, the pedal arm 200 may be forcibly rotated forward by the pedal arm contact part 138 of the pedal member 100. This can prevent a leg injury to a driver caused by the brake pedal apparatus.

As is apparent from the above description, the pedal member is manufactured by bending one steel plate to improve workability and productivity and to decrease manufacturing costs.

Furthermore, the cowl coupling part, which requires high strength, is formed by overlapping two parts of the one steel plate to form surface contact. Thereby, forming the pedal member is easy and, because it is unnecessary to use a separate thick steel plate, manufacturing costs are decreased.

In addition, in the event of a crash or a rear-end collision, the pedal arm is forcibly rotated by contact with the pedal arm contact part of the pedal member. Thus, leg injury of the driver due to the pedal apparatus may be prevented.

Although the embodiments of the present disclosure have been described above with reference to the accompanying drawings, those skilled in the art will appreciate that the disclosed brake pedal apparatus can be implemented in various other embodiments without changing the technical ideas or features thereof.

What is claimed is:

1. A brake pedal apparatus for a vehicle comprising:
    a pedal member coupled to a car body, the pedal member being formed of one steel plate; and
    a pedal arm rotatably coupled to the pedal member,
    wherein the pedal member includes
        a dash panel coupling part formed at a center of the pedal member, a pair of side parts formed at left and right sides of the dash panel coupling part, and an extended part having a linear shape, the extended part being formed between the pair of side parts, wherein the extended part includes a cowl coupling part, a switch coupling part, and a pedal arm contact part, which is configured to contact the pedal arm upon an accident, and wherein the pedal arm includes a pedal arm protrusion, which is disposed at one end portion of the pedal arm, the pedal arm protrusion being configured to contact the pedal arm contact part when the pedal member is deformed to decrease a distance between the dash panel coupling part and bolt holes formed at the pair of side parts in the event of an accident.

2. The brake pedal apparatus according to claim 1, wherein the pedal member is formed from an expanded pedal member by multiple bends in the one steel plate, and wherein the one steel plate is formed to define a shape of the expanded pedal member.

3. The brake pedal apparatus according to claim 1, wherein the steel plate has a uniform thickness before the pedal member is formed by bending.

4. The brake pedal apparatus according to claim 1, wherein a hinge bolt passes through the bolt holes, and the hinge bolt functions as a center of rotation of the pedal arm.

5. The brake pedal apparatus according to claim 4, further comprising:

bending lines formed at boundaries between the pair of side parts and the dash panel coupling part such that the pair of side parts are bent to face toward each other while being perpendicular to the dash panel coupling part, such that the bolt holes are collinear after bending the pedal member.

6. The brake pedal apparatus according to claim 1, wherein the extended part has a plurality of bending lines, and wherein the extended part has a first, a second, a third, a fourth, a fifth, a sixth, and a seventh surface defined by at least a portion of the plurality of bending lines in a longitudinal direction of the extended part.

7. The brake pedal apparatus according to claim 6, wherein the pedal arm contact part is a boundary defining the first surface and the second surface of the extended part and the pedal arm contact part is a part protruding rearward to face the pedal arm, wherein the cowl coupling part is disposed above the pedal arm contact part, the cowl coupling part is defined by the third surface and the fourth surface of the extended part, the third and fourth surfaces protruding outside the pair of side parts, and the third and fourth surfaces of the cowl coupling part are bent to overlap each other, and wherein the switch coupling part is defined by the seventh surface disposed at an end of the extended part.

8. The brake pedal apparatus according to claim 6, wherein a part of the second surface, a part of the fifth surface, and one bending line of the plurality of bending lines defining the sixth surface and the seventh surface are disposed at a space between the pair of side parts, respectively, and wherein portions of both sides of the second surface, portions of both sides of the fifth surface, and both sides of the seventh bending line are coupled to the pair of side parts using welding, respectively.

9. The brake pedal apparatus according to claim 1, wherein, the pedal arm is coupled to the pedal member and the pedal member is coupled to a dash panel and a cowl of the vehicle, wherein the dash panel and the dash panel coupling part are configured to push in a rearward direction toward where a driver would be seated while the pair of side parts are configured to deform outward away from one another relative to the pedal member, wherein the pedal arm contact part is configured to contact the pedal arm protrusion at a predetermined distance between the dash panel coupling part and the bolt holes in the pair of side parts upon deformation of the pair of side parts, and wherein the pedal arm is configured to forcibly rotate forward by force of the pedal arm contact part.

* * * * *